Patented May 23, 1939

2,159,364

UNITED STATES PATENT OFFICE 2,159,364

ETHERS OF 1,3-DIHYDROXY-ISOBUTANE AND 1-CHLORO-3-HYDROXY-ISOBUTANE

Gerald H. Coleman and Garnett V. Moore, Midland, Mich., assignors to The Dow Chemical Company, Midland, Mich., a corporation of Michigan No Drawing. Application April 28, 1937, Serial No. 139,581

9 Claims. (Cl. 260—612)

This invention concerns certain new ethers of 1,3-dihydroxy-isobutane and a method of making the same.

The new ethers herein disclosed have the general formula

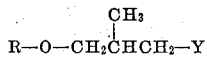

wherein R represents an aromatic radical and Y represents chlorine or an aryloxy radical. The compounds having said formula are usually high boiling, colorless liquids, although they are sometimes obtained in solid form. They are useful as solvents and plasticizers in compositions comprising cellulose derivatives, resins, etc., and may also be employed as chemical agents from which a variety of other organic products may be prepared. Diaryl ethers having the above formula are also useful as dielectric agents.

The new ethers are prepared by heating 1,3-dichloro-isobutane to a reaction temperature with a metal phenate (or a mixture of a phenol and a metal hydroxide) in the presence or absence of a reaction medium, such as water, benzene, etc. Among the various phenolic compounds which may be employed in the reaction are phenol; guaiacol; 4-ethoxy-phenol; ortho-, meta-, or para-cresol; ortho-, meta-, or para-phenylphenol; xylenol; cyclohexyl-phenols; tertiary-alkyl phenols such as tertiary-butyl phenol and tertiary-amyl phenol; etc. The alkali employed in the reaction is preferably an alkali metal hydroxide, e. g., sodium or potassium hydroxide, although other metal hydroxides, such as calcium or barium hydroxide may be used.

The reactants may be employed in any desired proportions, but, for sake of economy, and to avoid side reactions which may occur, especially when water is used as a reaction medium, the metal hydroxide is preferably employed in a proportion not greatly exceeding that required to form a salt of the phenol. When a mono-aryl ether of a halo-isobutanol is the major product desired, one molecular equivalent or more of dichloro-isobutane is preferably employed per mol of the phenol. When a diaryl ether is desired, approximately two mols or more of a phenol or a salt thereof is preferably used per mol of the 1,3-dichloro-isobutane.

The reaction usually occurs smoothly at temperatures between 75° and 125° C., but may be carried out at considerably higher temperatures, if desired. It may be effected by heating the reaction mixture under reflux at atmospheric pressure or by heating it under pressure in a bomb or autoclave. The time of heating required to complete the reaction varies from a few minutes to a number of hours, depending upon the phenolic reactant employed, the temperature at which the reaction is carried out, etc.

Usually a mono-aryl ether of chloro-isobutanol and the corresponding diaryl ether of 1,3-dihydroxy-isobutane are produced simultaneously in the process, although the reaction conditions may be controlled, as hereinbefore explained, so as to obtain either of said ethers as the major product. The products are separated and purified by conventional procedure, e. g., distillation.

The following examples illustrate a number of ways in which the principle of the invention has been employed but are not to be construed as limiting the invention.

Example 1

A mixture of 4 gram mols of phenol, 4 gram mols of 1,3-dichloro-isobutane, 4 gram mols of sodium hydroxide, and 800 grams of water was heated to boiling under reflux for eight hours, after which the mixture was cooled and washed with water to remove sodium chloride therefrom. The ether products were then separated by distilling the mixture. There were obtained 1-chloro-3-phenoxy-isobutane, a colorless liquid boiling at approximately 115°–118° C. under 10 mm. pressure, having the specific gravity of 1.086 at 20° C. with respect to water at 4° C., and having the formula:

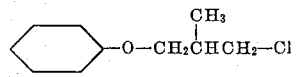

and 1,3-diphenoxy-isobutane, a colorless liquid boiling at approximately 140°–141° C. at 2 mm. pressure, having a specific gravity of about 1.051 at 20° C. and having the formula:

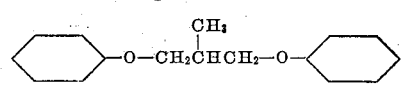

The yields of 1-chloro-3-phenoxy-isobutane and of 1,3-diphenoxy-isobutane were 58% and 29% of theoretical, respectively, based upon the phenol consumed in the reaction.

Example 2

A mixture of 4 gram mols of phenol, 2 gram mols of 1,3-dichloro-isobutane, 4.1 gram mols of sodium hydroxide and 500 grams of benzene was heated to a temperature of approximately 190° C. in a rotating iron bomb for six hours, after which the bomb was cooled and the charge removed. The reacted mixture was washed with water and then distilled to separate the ether products. 1-chloro-3-phenoxy and 1,3-diphenoxy-isobutane were obtained in yields representing 11% and 67% of theoretical, respectively, based upon the phenol consumed in the reaction. The properties of said products are given in Example 1.

*Example 3*

A mixture of 2 gram mols of ortho-cresol, 2 gram mols of 1,3-dichloro-isobutane, 2 gram mols of sodium hydroxide and 360 grams of water was heated under reflux at temperatures between 96° and 100° C. for 24 hours. The ether products were then separated as in Example 1. There were obtained 1-chloro-3-(2-methyl-phenoxy)-isobutane, a colorless liquid boiling at 165°–167° C. under 50 millimeters pressure, having a specific gravity of about 1.060 at 20° C., and having the formula:

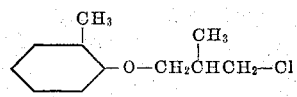

and 1,3-di-(2-methyl-phenoxy)-isobutane, a colorless liquid boiling at approximately 170°–173° C. at 1 mm. pressure, having a specific gravity of about 1.091 at 20° C., and having the formula:

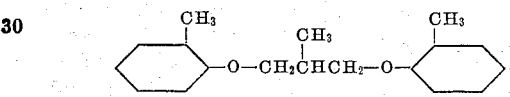

The yields of 1-chloro-3-(2-methyl-phenoxy)-isobutane, and 1,3-di-(2-methyl-phenoxy)-isobutane were 54% and 33% of theoretical, respectively, based upon the ortho-cresol consumed.

*Example 4*

A mixture of 2 gram mols of guaiacol, 2 gram mols of 1,3-dichloro-isobutane, 2 gram mols of sodium hydroxide, and 360 grams of water was heated under reflux at temperatures between 95° and 101.5° C. for 24 hours, after which the ether products were separated as in Example 1. There were obtained 1-chloro-3-(2-methoxy-phenoxy)-isobutane, a colorless liquid boiling at approximately 145°–148° C. under 10 mm. pressure, having the specific gravity of approximately 1.129 at 20° C. and having the formula:

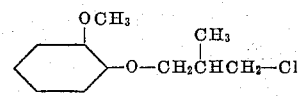

and 1,3-(2-methoxy-phenoxy)-isobutane, a colorless liquid boiling at approximately 190°–193° C. under 1 mm. pressure, having the specific gravity of about 1.171 at 20° C. and having the formula:

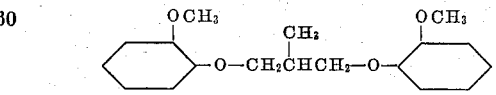

The yields of 1-chloro-3-(2-methoxy-phenoxy)-isobutane and 1,3-di-(2-methoxy-phenoxy)-isobutane were 55% and 33% of theoretical, respectively, based upon the guaiacol reacted.

*Example 5*

A mixture of 1 gram mol of ortho-cyclohexyl-phenol, 1 gram mol of 1,3-dichloro-isobutane, 1 gram mol of sodium hydroxide and 180 grams of water was heated under reflux at temperatures between 98° and 102° C. for 24 hours, after which the ether products were separated as in Example 1. There were obtained 1-chloro-3-(2-cyclohexyl-phenoxy)-isobutane, a colorless liquid boiling at approximately 138°–140° C. under 2 mm. pressure, having a specific gravity of about 1.056 at 20° C. and having the formula:

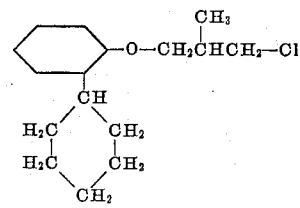

and 1,3-di-(2-cyclohexyl-phenoxy)-isobutane, an extremely viscous nearly colorless liquid boiling at approximately 244°–248° C. under 2 mm. pressure and having the formula:

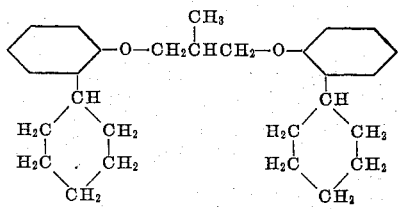

The yields of 1-chloro-3-(2-cyclohexyl-phenoxy)-isobutane and 1,3-di-(2-cyclohexyl-phenoxy)-isobutane were 57% and 26% of theoretical, respectively, based upon the cyclohexyl-phenol reacted.

*Example 6*

A mixture of 2 gram mols of beta-naphthol, 2 gram mols of 1,3-dichloro-isobutane, 2 gram mols of sodium hydroxide and 360 grams of water was heated under reflux at temperatures between 95° and 102° C. for 24 hours, after which the mixture was cooled, washed with water, and distilled. The fraction distilling at temperatures between about 142° and 144° C. at 1 mm. pressure was obtained as a nearly colorless liquid having a specific gravity of about 1.138 at 20° C., but on standing it crystallized as white crystals melting at approximately 43.5° C. It was 1-chloro-3-(beta-naphthoxy)-isobutane having the formula:

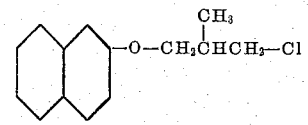

As a residue from the distillation a nearly black, hard, brittle resin, softening at 76.5° C., was obtained. The molecular weight of the resin corresponded to that of the compound 1,3-di-(beta-naphthoxy)-isobutane having the formula:

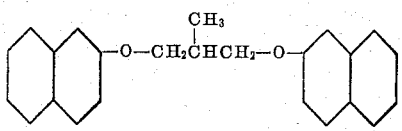

and the resin is believed to consist almost entirely of said compound. The yields of 1-chloro-3-(beta-naphthoxy)-isobutane and 1,3-di-(beta-naphthoxy)-isobutane were about 65% and 35% of theoretical, respectively, based upon the beta-naphthol consumed in the reaction.

*Example 7*

A mixture of 2 gram mols of para-tertiary-butyl-phenol, 2 gram mols of 1,3-dichloro-isobutane, 2 gram mols of sodium hydroxide, and 400 grams of water was heated under reflux at temperatures between 95° and 102° C. for 24 hours. The ether products were then separated as in Example 1. There were obtained 1-chloro-3-(4-tertiarybutyl-phenoxy)-isobutane, a colorless liquid boiling at approximately 110°–112° C. at 2 mm. pressure, having the specific gravity 1.023 at 20° C. and having the formula:

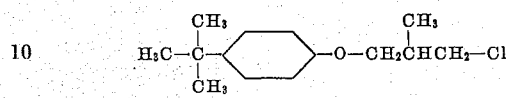

and 1,3-di-(4-tertiarybutyl-phenoxy)-isobutane, a pale-yellow solid resin boiling at approximately 198°–200° C. at 2 mm. pressure, having the specific gravity 0.988 at 50° C. with respect to water at 4° C. and having the formula:

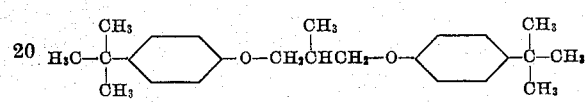

Example 8

A mixture of 3 gram mols of 2-phenylphenol, 3 gram mols of 1,3-dichloro-isobutane, 3.08 gram mols of sodium hydroxide and 750 grams of water was heated under reflux at temperatures between 93° and 101° C. for 10 hours, after which the products were separated as in Example 1. There were obtained 1-chloro-3-(2-phenyl-phenoxy)-isobutane, a viscous liquid boiling at approximately 170°–173° C. at 5 mm. pressure and having the formula:

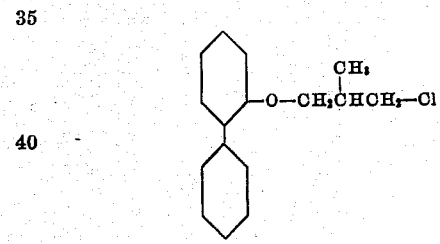

and 1,3-di-(2-phenyl-phenoxy)-isobutane, a more viscous liquid boiling at approximately 280°–285° C. at 5 mm. pressure and having the formula:

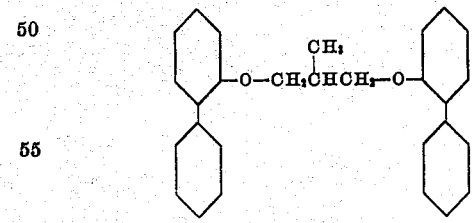

In the following claims the term "xenyl" is used in accordance with established nomenclature as referring to the monovalent phenyl-phenyl radical.

Other modes of applying the principle of the invention may be employed instead of those explained, change being made as regards the method or compounds herein disclosed, provided the steps or compounds stated by any of the following claims or the equivalent of such stated steps or compounds be employed.

We therefore particularly point out and distinctly claim as our invention:

1. An aryl ether of an alcohol selected from the class consisting of 1-chloro-3-hydroxy-isobutane and 1,3-dihydroxy-isobutane, said ether containing no free hydroxyl group.

2. An ether having the general formula

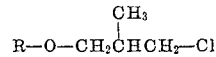

wherein R represents an aromatic radical.

3. An ether having the general formula

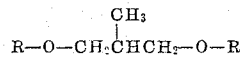

wherein R represents an aromatic radical.

4. A xenyl ether of an alcohol selected from the class consisting of 1-chloro-3-hydroxy-isobutane and 1,3-dihydroxy-isobutane, said ether containing no free hydroxyl group.

5. An ether having the formula

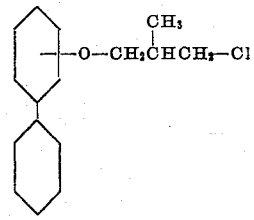

6. 1-chloro-3-(2-phenyl-phenoxy)-isobutane, a viscous liquid boiling at 170°–173° C. at 5 mm. pressure and having the formula

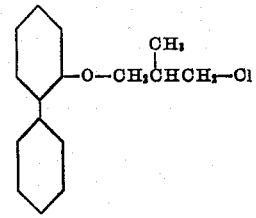

7. 1,3-di-(2-phenyl-phenoxy)-isobutane, a viscous liquid boiling at 280°–285° C. at 5 mm. pressure and having the formula

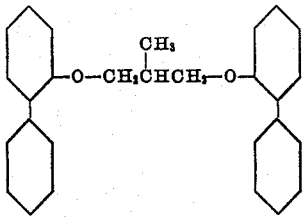

8. 1-chloro-3-phenoxy-isobutane, a colorless liquid boiling at approximately 115°–118° C. at 10 mm. pressure, having a specific gravity of about 1.086 at 20° C. and having the formula

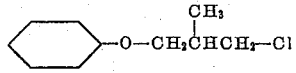

9. The method which comprises reacting a metal phenate with 1,3-dichloro-isobutane to form an aryl ether of an alcohol selected from the class consisting of 1-chloro-3-hydroxy-isobutane and 1,3-dihydroxy-isobutane.

GERALD H. COLEMAN.
GARNETT V. MOORE.